United States Patent
Schlenker

(10) Patent No.: US 12,440,946 B2
(45) Date of Patent: Oct. 14, 2025

(54) CLAMP ASSEMBLIES AND METHODS

(71) Applicant: Knight Industries & Associates, Inc., Auburn Hills, MI (US)

(72) Inventor: Robert Schlenker, Troy, MI (US)

(73) Assignee: Knight Industries & Associates, Inc., Auburn Hills, MI (US)

( * ) Notice: Subject to any disclaimer, the term of this patent is extended or adjusted under 35 U.S.C. 154(b) by 341 days.

(21) Appl. No.: 18/106,440

(22) Filed: Feb. 6, 2023

(65) Prior Publication Data

US 2023/0330816 A1    Oct. 19, 2023

Related U.S. Application Data

(60) Provisional application No. 63/391,435, filed on Jul. 22, 2022, provisional application No. 63/330,928, filed on Apr. 14, 2022.

(51) Int. Cl.
  *B25B 5/06*  (2006.01)
  *B23Q 3/06*  (2006.01)

(52) U.S. Cl.
  CPC ............... *B25B 5/068* (2013.01); *B23Q 3/06* (2013.01)

(58) Field of Classification Search
  CPC ....... B23P 19/04; B23P 19/10; B23P 2700/50; B23Q 3/00; B23Q 3/06; B25B 5/068; B25B 5/142; B25B 5/02
  See application file for complete search history.

(56) References Cited

U.S. PATENT DOCUMENTS

| | | | |
|---|---|---|---|
| 6,061,890 A | 5/2000 | Shashlo et al. | |
| 6,474,632 B1 * | 11/2002 | Liou | B25B 5/068 |
| | | | 269/170 |
| 8,132,310 B2 | 3/2012 | Suga et al. | |
| 2015/0013133 A1 | 1/2015 | Lee | |
| 2022/0033020 A1 | 2/2022 | Yokote et al. | |

FOREIGN PATENT DOCUMENTS

| | | | |
|---|---|---|---|
| CN | 109333411 A | 2/2019 | |
| CN | 110182280 B | 4/2021 | |
| DE | 102010010627 A1 | 9/2011 | |
| DE | 102012005425 A1 * | 9/2013 | ............... B25B 5/14 |
| KR | 100507481 B1 | 8/2005 | |
| KR | 100527997 B1 | 11/2005 | |

OTHER PUBLICATIONS

Machine Translation of DE 10 2012 005425 A1 (Year: 2013).*

* cited by examiner

*Primary Examiner* — Christopher J. Besler
(74) *Attorney, Agent, or Firm* — Carlson, Gaskey & Olds, P.C.

(57) ABSTRACT

A clamp assembly for a work carrier according to an example of this disclosure includes a base for mounting to the work carrier and including a rotatable spur gear. A slider includes a main housing, a rack with a plurality of teeth along an upper surface of the rack for engaging the spur gear for linear movement of the slider relative to the base, and a clamp extension extending from the main housing to engage an edge of the work object.

10 Claims, 11 Drawing Sheets

CLAMP ASSEMBLIES AND METHODS

CROSS-REFERENCE TO RELATED APPLICATIONS

This application claims priority to U.S. Provisional Application No. 63/391,435, filed Jul. 22, 2022, incorporated by reference in its entirety and U.S. Provisional Application No. 63/330,928, filed Apr. 14, 2022 incorporated by reference in its entirety.

BACKGROUND

Work carriers may be used in an automobile assembly line for conveyance of a work object, such as vehicle door, to various stations in a processing line, such as an assembling station where a window glass and other parts are assembled with the door. During production of a vehicle, one may take the vehicle door off the vehicle body and from the assembly line to a remote assembly station. In the remote assembly station, the vehicle door is placed in the work carrier, on which other parts are assembled with the door.

SUMMARY

A work carrier according to an example of this disclosure includes a frame for supporting a work object. A clamp assembly is fixed to the frame, which includes a base mounted to the frame and including a rotatable spur gear. A slider includes a main housing, a rack with a plurality of teeth along an upper surface of the rack for engaging the spur gear for linear movement of the slider relative to the base, and a clamp extension extending from the main housing to engage an edge of the work object.

In a further example of the foregoing, a one-way roller clutch bearing is provided at a rotational axis of the spur gear to, when the spur gear is engaged with the plurality of teeth of the rack, permit movement of the slider in a first linear direction but prevent movement of the slider in a second linear direction opposite the first linear direction.

In a further example of any of the foregoing, the base includes a lever for releasing the spur gear from the rack to allow the slider to move in the second linear direction.

In a further example of any of the foregoing, a slide rail assembly has a slide rail fixed to one of the base and the slider and a guide fixed to the other of the base and the slider.

In a further example of any of the foregoing, the spur gear has a second plurality of teeth that engage the plurality of teeth of the rack.

In a further example of any of the foregoing, a spring is configured to bias the slider in the second linear direction.

In a further example of any of the foregoing, the spring is a constant force spring.

In a further example of any of the foregoing, the spring includes a spiral wound strip wrapped around a rotatable spool and having one end fixed to the housing.

A clamp assembly for a work carrier according to an example of this disclosure includes a base for mounting to the work carrier and including a rotatable spur gear. A slider includes a main housing, a rack with a plurality of teeth along an upper surface of the rack for engaging the spur gear for linear movement of the slider relative to the base, and a clamp extension extending from the main housing to engage an edge of the work object.

In a further example of the foregoing, a one-way roller clutch bearing is provided at a rotational axis of the spur gear to, when the spur gear is engaged with the plurality of teeth of the rack, permit movement of the slider in a first linear direction but prevent movement of the slider in a second linear direction opposite the first linear direction.

In a further example of any of the foregoing, the base includes a lever for releasing the spur gear from the rack to allow the slider to move in the second linear direction.

In a further example of any of the foregoing, a slide rail assembly has a slide rail fixed to one of the base and the slider and a guide fixed to the other of the base and the slider.

In a further example of any of the foregoing, the spur gear has a second plurality of teeth that engage the plurality of teeth of the rack.

In a further example of any of the foregoing, a spring is configured to bias the slider in the second linear direction.

In a further example of any of the foregoing, the spring is a constant force spring.

In a further example of any of the foregoing, the spring includes a spiral wound strip wrapped around a rotatable spool and having one end fixed to the housing.

A method for supporting a work object according to an example of this disclosure includes attaching a clamp assembly to a frame that supports the work object. The clamp assembly includes a base mounted to the frame and includes a rotatable spur gear. A slider includes a main housing, a rack with a plurality of teeth along an upper surface of the rack for engaging the spur gear for linear movement of the slider relative to the base, and a clamp extension extending from the main housing. The example method includes moving the slider linearly such that the clamp extension contacts the work object to support the work object.

In a further example of the foregoing, the clamp assembly includes a one-way roller clutch bearing provided at a rotational axis of the spur gear to, when the spur gear is engaged with the plurality of teeth of the rack, permit movement of the slider in a first linear direction but prevents movement of the slider in a second linear direction opposite the first linear direction.

In a further example of any of the foregoing, the clamp assembly includes a spring, which is configured to bias the slider in the second linear direction.

In a further example of any of the foregoing, the spring is a constant force spring and includes a spiral wound strip wrapped around a rotatable spool and having one end fixed to the housing.

These and other features may be best understood from the following specification and drawings, the following of which is a brief description.

DETAILED DESCRIPTION

This application relates generally to work carriers for work objects, and more specifically to clamp assemblies and methods for supporting work objects. While a door is disclosed in some illustrative examples as the work object, other work objects will benefit from this disclosure.

Figure 1:
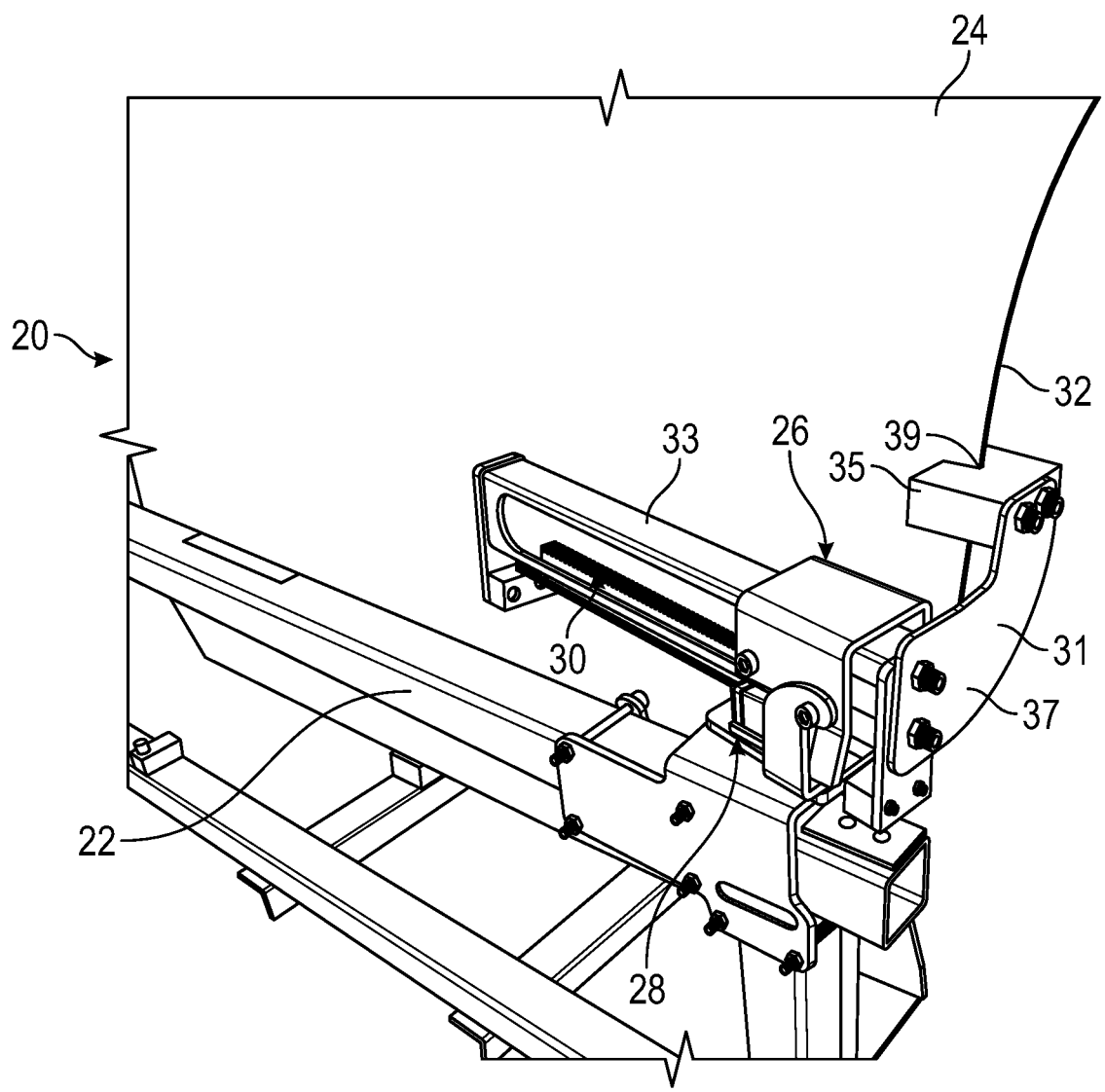
FIG. 1 illustrates an example work carrier.

FIG. 1 illustrates a work carrier 20 including a frame 22 for supporting a work object, the example being a vehicle door 24. A clamp assembly 26 is fixed to the frame 22 and includes a base 28 mounted to the frame 22 and a slider 30 slidably engaged with the base 28.

A clamp extension 31 extends from a housing 33 of the slider 30 to engage an edge 32 of the vehicle door 24 for supporting the vehicle door 24. In some examples, as shown, the extension 31 includes a plate 37 attached to the housing 33 at one end and having a block 35 at the other end. The example block 35 has a shape complementary in contour to the shape of an edge 32 of the vehicle door 24 so that the edge 32 can be received against the block 35. In some examples, the block 35 includes one or more grooves 39 for receiving the edge 32 of the door 24. The example clamp assembly 26 is shown in a clamped position, in which the edge 32 is received in the groove 39, securing the vehicle door 24 to the work carrier 20. In some examples, the housing 33 can accommodate an extension 31 at either end such that it can be used in right-hand or left-hand applications. In some examples, the block 35 includes ultra high molecular weight polyethylene or cast urethane.

Figure 2:
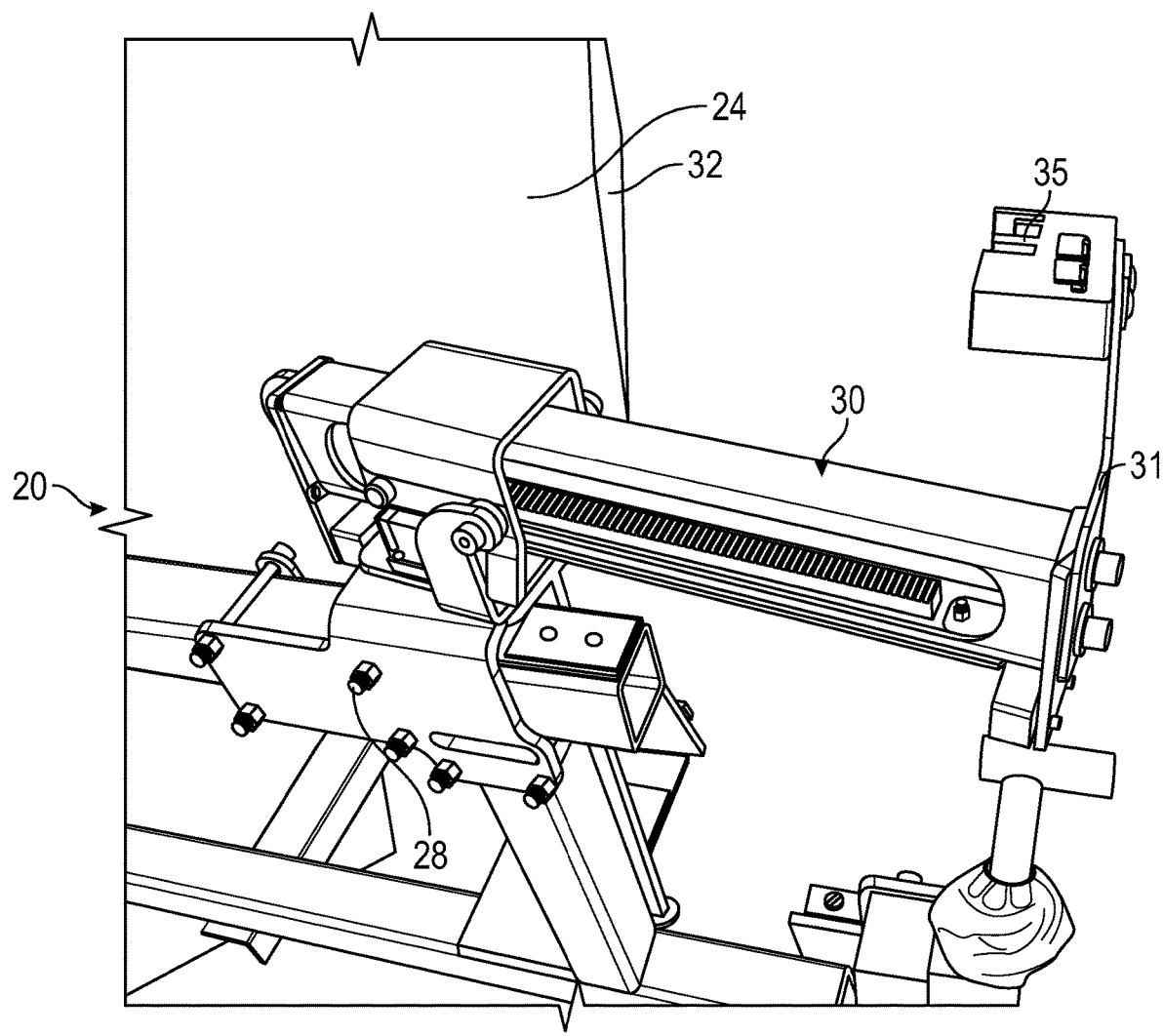
FIG. 2 illustrates another view of the example work carrier of FIG. 1.

FIG. 2 illustrates another view of the example work carrier 20 in an unclamped position, in which the slider 30 is extended such that the block 35 is spaced from the edge 32 of the vehicle door 24. The slider 30 is therefore movable relative to the base 28 between an unclamped position and a clamped position. The terms "unclamped position" and "open position" are used interchangeably throughout this application. The terms "clamped position" and "closed position" are used interchangeably throughout this application.

Figure 3:
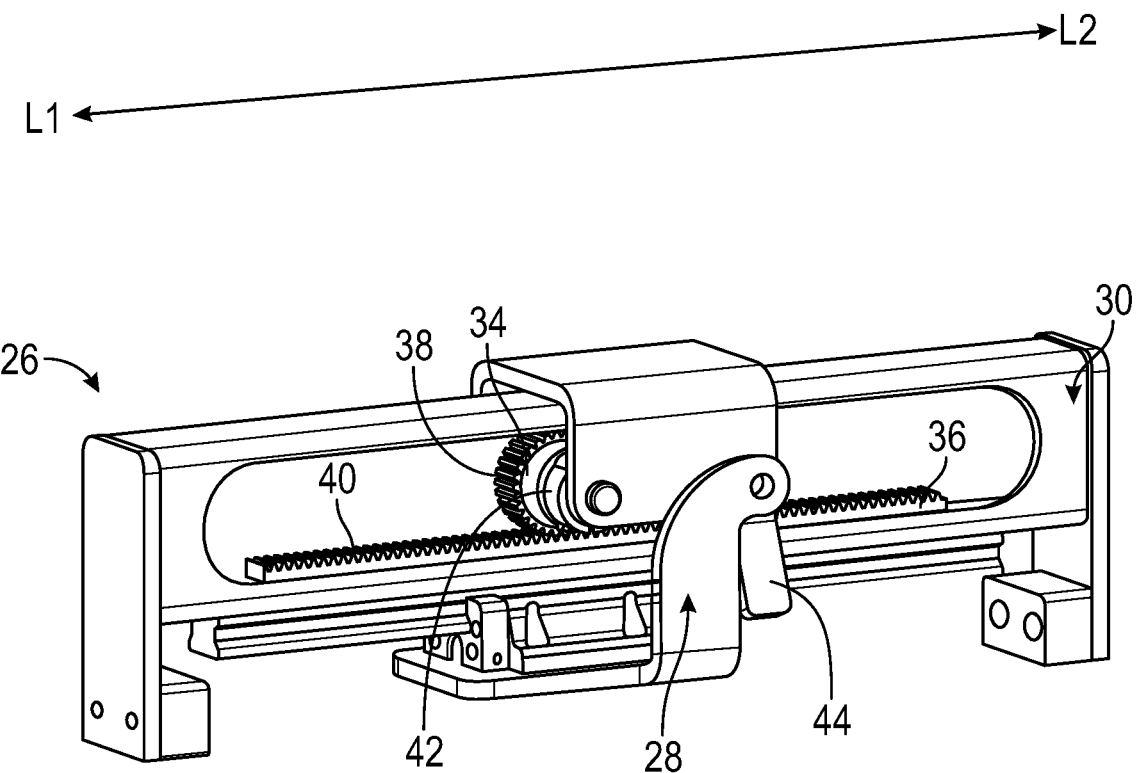
FIG. 3 illustrates an example clamp assembly of the example work carrier of FIGS. 1 and 2.

FIG. 3 illustrates the example clamp assembly 26 of FIGS. 1 and 2, with clamp extension 31 removed for viewing. The example base 28 includes a rotatable spur gear 34 that engages a rack 36 of the slider 30. The example spur gear 34 includes teeth 38 that engage teeth 40 on an upper surface of the rack 36 allowing for linear movement of the slider 30 relative to the base 28. In the examples, the spur gear 34 and rack 36 are metallic, but other materials are contemplated.

In some examples, as shown, a one-way roller clutch bearing 42, such as a one-way needle roller bearing, is concentric with the spur gear 34 to, when the spur gear 34 is engaged with the teeth 40, permit movement of the slider 30 in a first linear direction L1 but prevent movement of the slider 30 in a second linear direction L2 opposite the first linear direction. The roller clutch bearing 42 creates a controlled or locked position when a negative force (attempting to move slider 30 in the second linear direction L2) is applied, such as when the clamp assembly 26 is in a clamped position and a force is applied to move the clamp assembly to an unclamped position. In some examples, as shown, the base 28 includes a lever 44 for releasing the spur gear 34 from the rack 36 to allow the slider 30 to move in the second linear direction L2 when desired.

Figure 4:
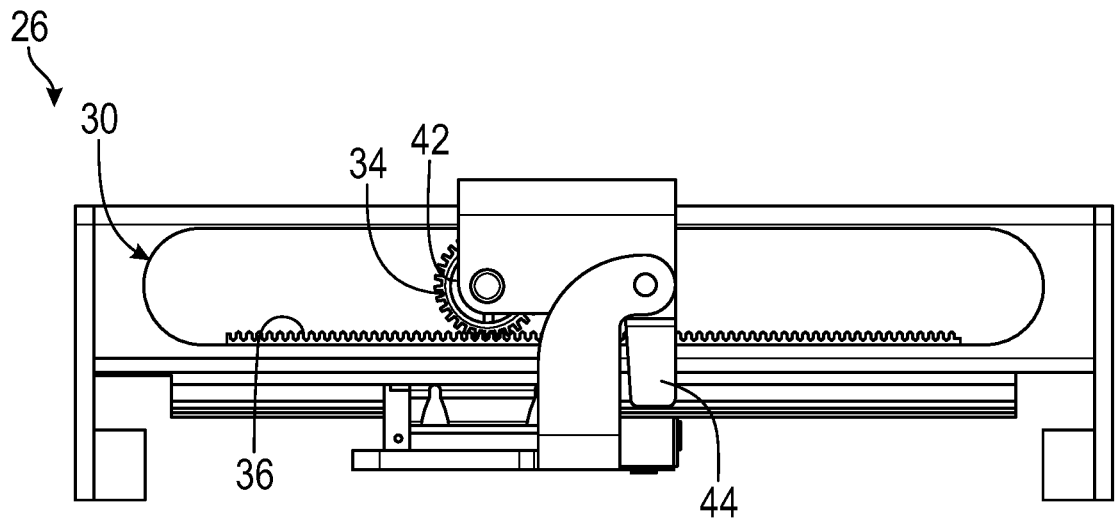
FIG. 4 illustrates the example clamp assembly of FIG. 3 in a gear engaged position.

FIG. 4 illustrates the example clamp assembly 26 in a gear engaged position, in which the spur gear 34 is engaged with the teeth 40 such that linear movement in only one direction is permitted. The example clamp assembly 26 may be oriented such that the spur gear 34 is biased to engage the rack 36 in the gear engaged position by way of gravity. With the lever 44 in its normal resting position as shown, force applied along the linear joint allows controlled movement of the slider 30 in a positive (L1) direction. However, once a negative force (attempting to move slider 30 in the second linear direction L2) is applied, the one-way roller clutch bearing 42 will engage and prevent movement of the slider 30 in the L2 direction. In some examples, as shown, the clamp assembly 26 does not require springs to be biased in the gear engaged position.

Figure 5:
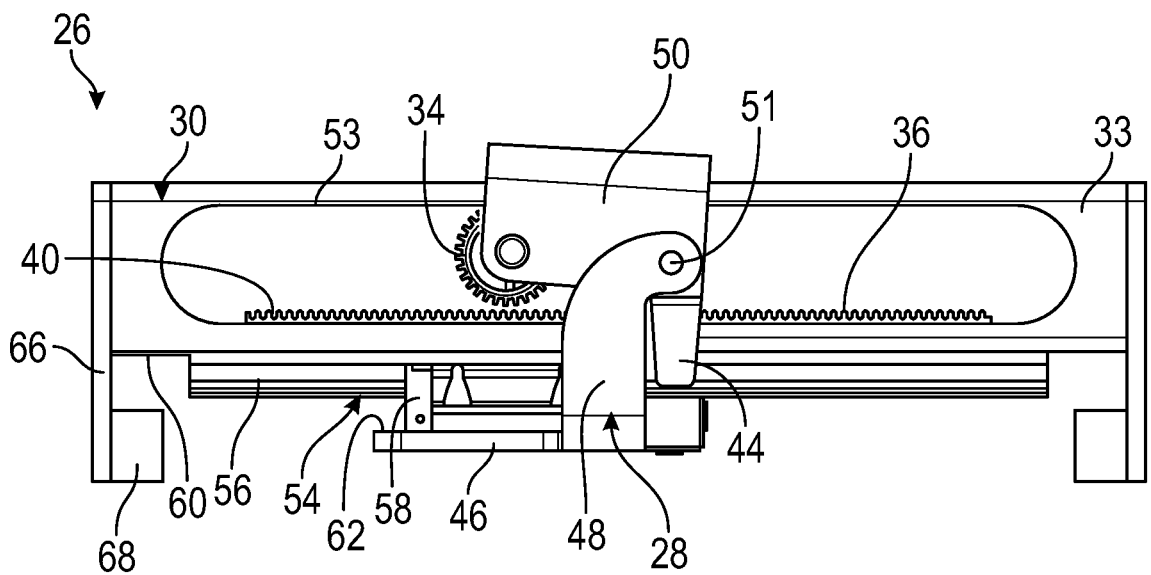
FIG. 5 illustrates the example clamp assembly of FIGS. 3 and 4 in a gear disengaged position.

FIG. 5 illustrates the example clamp assembly 26 in a gear disengaged position in which the spur gear 34 is not engaged with the teeth 40, such that linear movement of the slider 30 in both linear directions L1 and L2 is permitted. That is, force applied to the slider 30 in either linear direction L1/L2 when in the disengaged position will permit movement of the slider 30 in that direction. In some examples, as shown, the base 28 includes a platform 46 and one or more arms 48 extending from the platform 46. Although one arm 48 is shown in FIG. 5, a second arm may be provided opposite the platform 46 in some examples. The one or more arms 48 are pivotably engaged with a hood 50 at a pivot point 51. The hood 50 is received over the main housing 33 of the slider 30, and the spur gear 34 is rotatably connected to the hood 50. The main housing 33 may include a longitudinal slot 53 to allow the spur gear 34 to extend into, and move linearly within, the main housing 33.

The lever 44 extends from the hood 50 to provide a handle for an operator to pivot the hood 50 about the pivot point 51 to engage or disengage the spur gear 34 from the rack 36, thereby moving the clamp assembly 26 between the gear engaged and gear disengaged positions. In some examples, the lever 44 is angled to extend laterally outward in a direction away from the housing 33 such that it contacts the arm 48 when pivoted to the disengaged position to prevent overpivoting that would cause the top of the spur gear 34 to contact the housing but also allow enough clearance between the spur gear 34 and the rack 36 to allow movement of the slider 30 in the L1 or L2 directions.

In some examples, a slide rail assembly 54 may be provided having a slide rail 56 fixed to one of the base 28 and the slider 30 and a guide 58 fixed to the other of the base 28 and the slider 30. In the example shown, the slide rail 56 is attached to a lower surface 60 of the main housing 33, and the guide 58 is attached to an upper surface 62 of the platform 46. The slide rail assembly 54 assists in guiding the slider 30 linearly and also keeps the base 28 and the slider 30 connected when the clamp assembly 26 is in the gear disengaged position. In some examples, by providing the slide rail assembly 54 under the lower surface 60, it is protected from unwanted impact or debris.

In some examples, as shown, one or more projections 66 may extend downward from the lower surface 60, and have bumpers 68 for limiting the linear movement of the slider 30, which may increase the longevity of the clamp assembly 26 in some examples.

Figure 6:
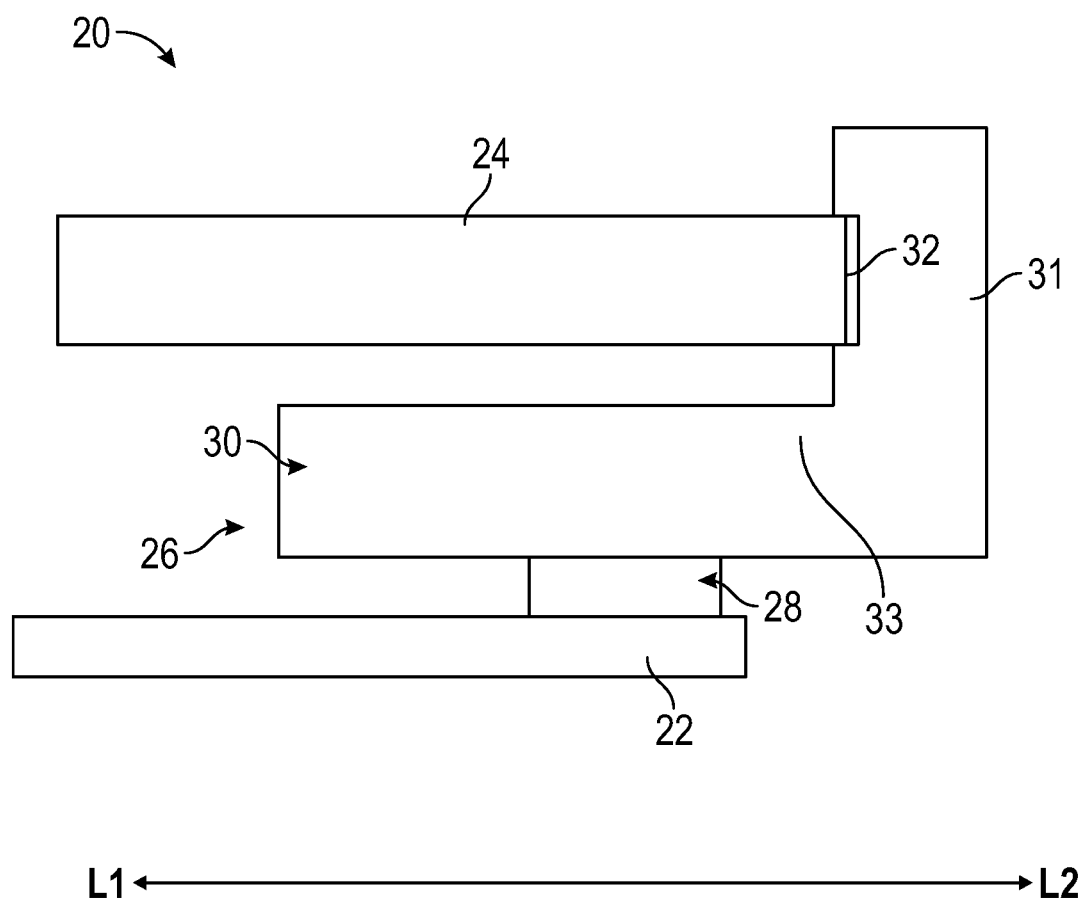
FIG. 6 schematically illustrates the example work carrier of FIGS. 1 and 2.

FIG. 6 schematically illustrates a top view of example work carrier 20, including the clamp assembly 26 supporting a vehicle door 24. The base 28 is fixed to the frame 22, and the slider 30 is moveable linearly relative to the base 28. The example slider 30, when in the gear engaged position, is moveable in the L1 direction until the extension 31 is received against the edge 32 of the vehicle door 24. The example slider 30, when in the gear engaged position, is not moveable in the L2 direction, such that the vehicle door 24 is supported and prevented from moving in the L2 direction once the extension 31 is received against the edge 32. Other supports (not shown) may be provided on the frame 22 to provide supporting forces to the vehicle door 24 in other directions. The example slider 30, when in the gear disengaged position, is moveable in the L1 and L2 directions.

With reference back to FIGS. 1 and 5, the base 28 is mounted to the frame 22 through the platform 46 in some examples. In other examples, it is contemplated that the main housing 33 of the slider 30 could be fixed to the frame 22, and the base 28 be linearly moveable and include an extension for abutting the vehicle door 24. That is, in some examples, one of the slider 30 and base 28 may be fixed to the frame 22, and the other of the slider 30 and base 28 may be moveable linearly.

Figure 7:
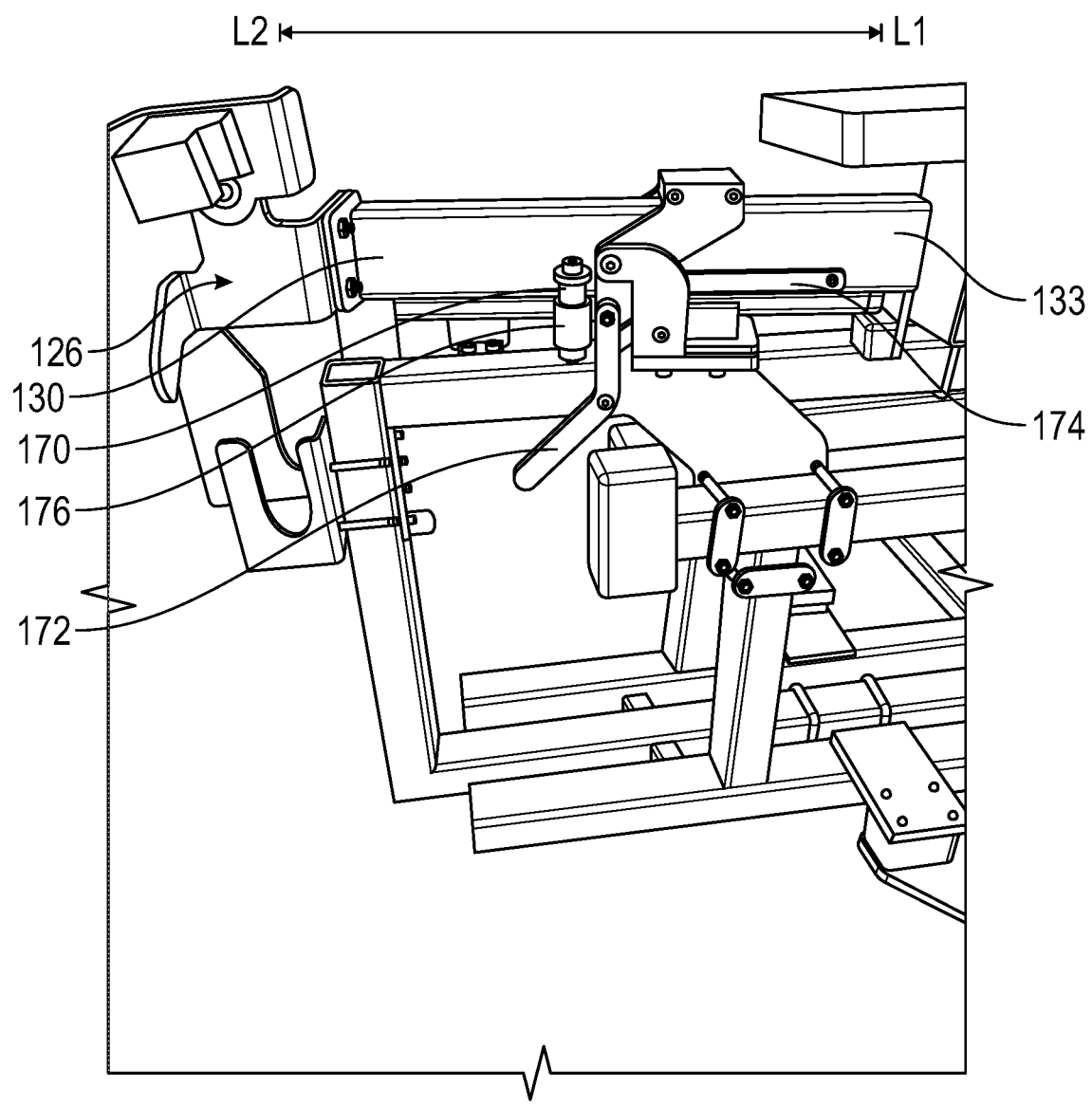
FIG. 7 illustrates another example clamp assembly.

FIG. 7 illustrates another example clamp assembly 126 substantially similar to the clamp assembly 26 except that it includes a spring 170 to bias the slider 130 in the L2 direction and a lever 172 for moving the clamp assembly 26 between the gear engaged and gear disengaged position. It should be understood that like reference numerals identify corresponding or similar elements throughout the several drawings. The example spring 170 is a constant force spring having a spiral wound strip 174 wrapped around a rotatable spool 176 and having one end fixed to the housing 133. In some examples, the strip 174 is fixed to the housing 133 at a side opposite the side providing the longitudinal slot 153 (not shown; see longitudinal slot 53 in FIG. 5).

Figure 8:
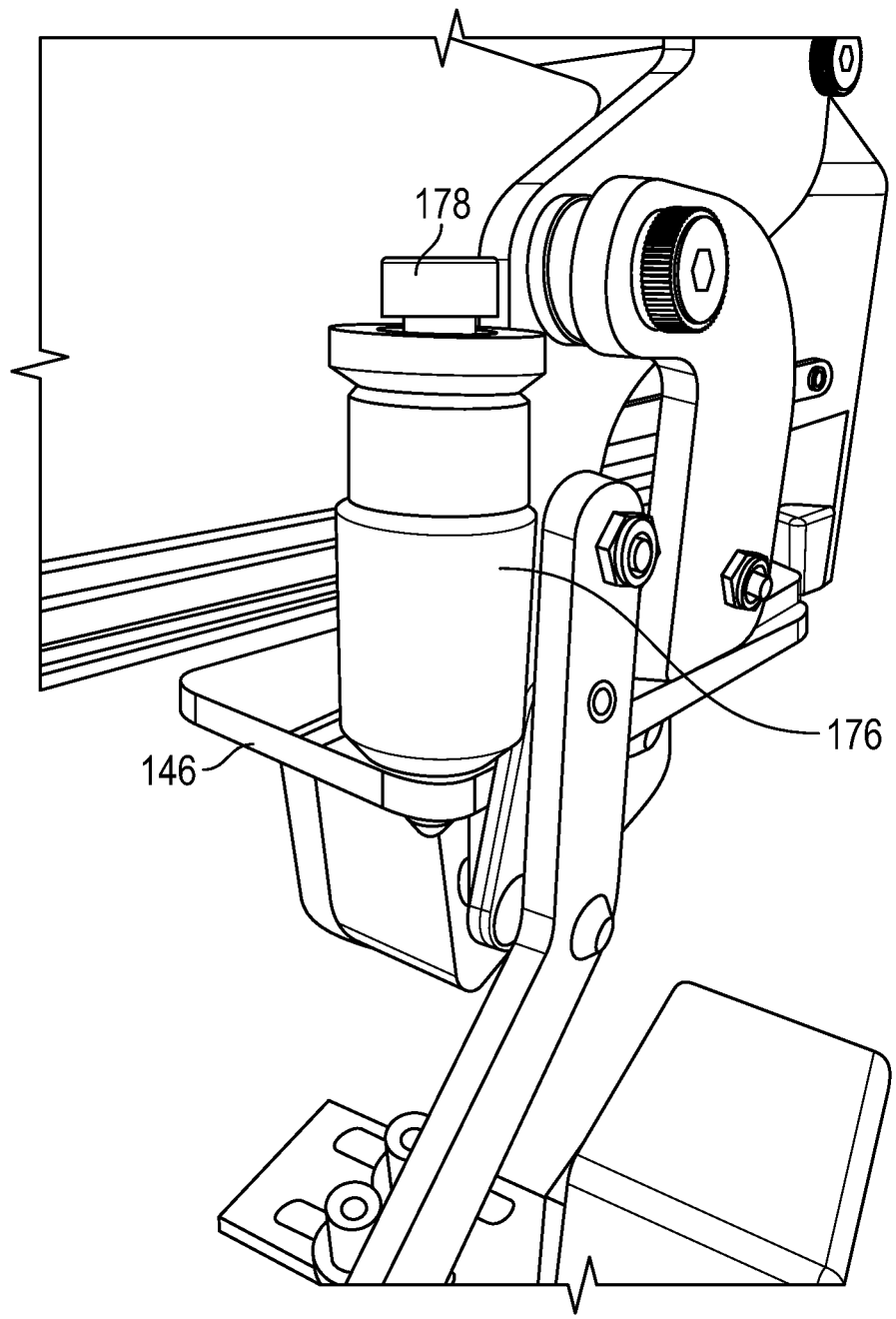
FIG. 8 illustrates a portion of the example clamp assembly shown in FIG. 7.

As shown in FIG. 8, in some examples, the spool 176 is rotatable about an axis provided by a shoulder screw 178 extending through the platform 146.

The spring 170 biases the slider 130 in the L2 direction. As such, when in a gear engaged position, due to the spring 170 and the one-way roller clutch bearing (not shown), the slider 130 does not move linearly relative to the base 128 in the L1 direction without an external force from an operator greater than the force exerted by the spring 170, and the slider 130 does not move in the L2 direction because of the one-way roller clutch bearing (not shown). When in the gear disengaged position, the slider is biased to move in the L2 direction, such the slider 130 moves in the L2 direction once the gears become disengaged, without any additional linear force in the L2 direction needed from the operator. That is, the spring 170 and one-way roller clutch bearing provide opposing linear forces on the slider 130 when in the gear engaged position.

Figure 9:
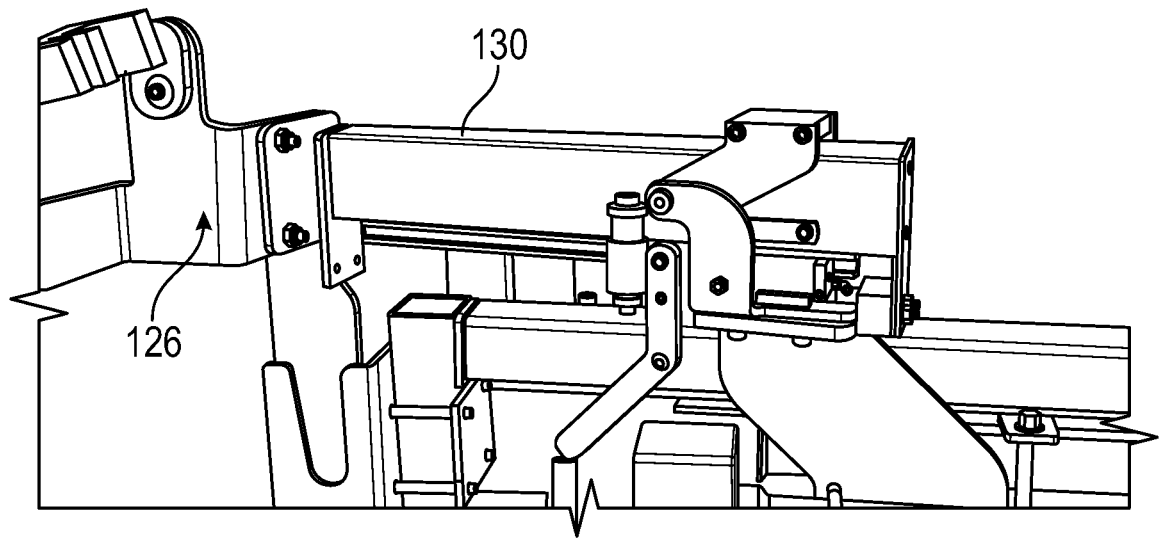
FIG. 9 illustrates the example clamp assembly shown in FIGS. 7 and 8 in an open position.
Figure 10:
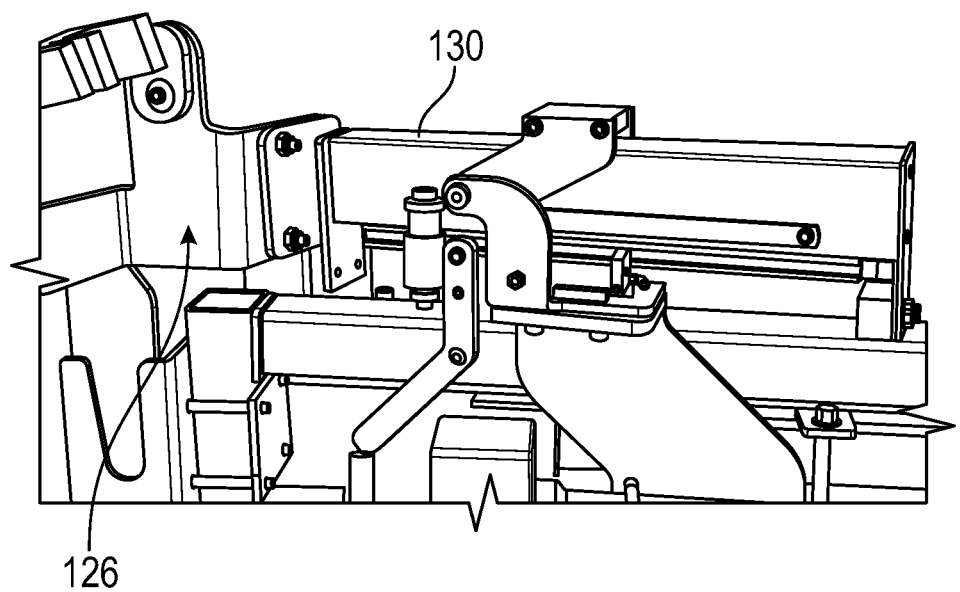
FIG. 10 illustrates the example clamp assembly shown in FIG. 7-9 in a closed position.

In some examples, biasing the slider 130 in the L2 direction allows the clamp assembly 126 to remain in an open position when desired, as shown in FIG. 9, such as when the carrier is moving through a production facility without a door or other work object on it. Applicant has found that it is desirable to have the clamp assembly 126 biased toward an open position in some applications. For example, when an empty carrier moves about a facility, it may travel uphill, downhill, experience vibrations, etc. that cause it to change positions. In the example clamp assembly 126, when the carrier is moving around a facility without a door or other work object on it, the clamp assembly 126 can be in the open position, and when the carrier is ready to receive a door or other work object, the operator can just move the slider 130 in the L1 direction from the open position to a closed position (FIG. 10) that secures the door or other work object (not shown), rather than having to move the slider 130 from the closed position, to the open position, and back to the closed position. This saves time on the line and extends the longevity of the part in some applications. Further, when the operator wants to move from a closed position to an open position, such as to remove a door or other work object, they can just move the clamp assembly to a disengaged position, causing the spring force to be unopposed by the roller bearing and the slider 130 to move in the L2 direction.

In some examples, the spring 170 is a constant force spring having between about a 2 to 4 lb. load. In some examples the spring 170 is a constant force spring having about a 2.6 lb. load (±20%). Other spring types may be utilized in some examples.

Figure 11:
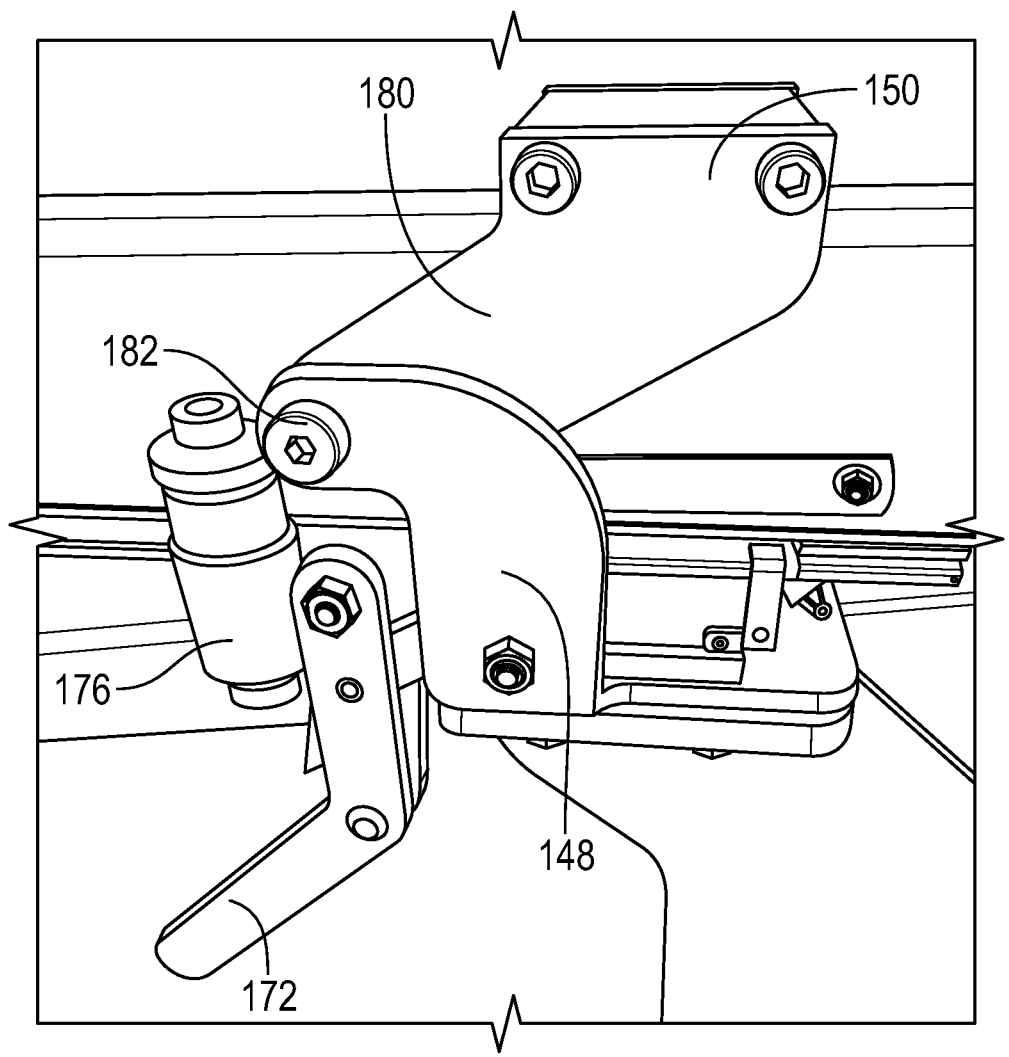
FIG. 11 illustrates a portion of the example clamp assembly shown in FIG. 7-10.

As shown in FIG. 11, a lever 172 extends from the hood 150 and is operable to move the example clamp assembly 126 between the gear engaged and gear disengaged position. In the example, the hood 150 includes an extension portion 180 and the lever 172 is fixed to the extension portion 180 between the spool 176 and the arm 148. The lever 172 and the hood 150 pivot about the pivot point 182 where the arm 148 is rotatably connected to the extension portion 180.

Figure 12:
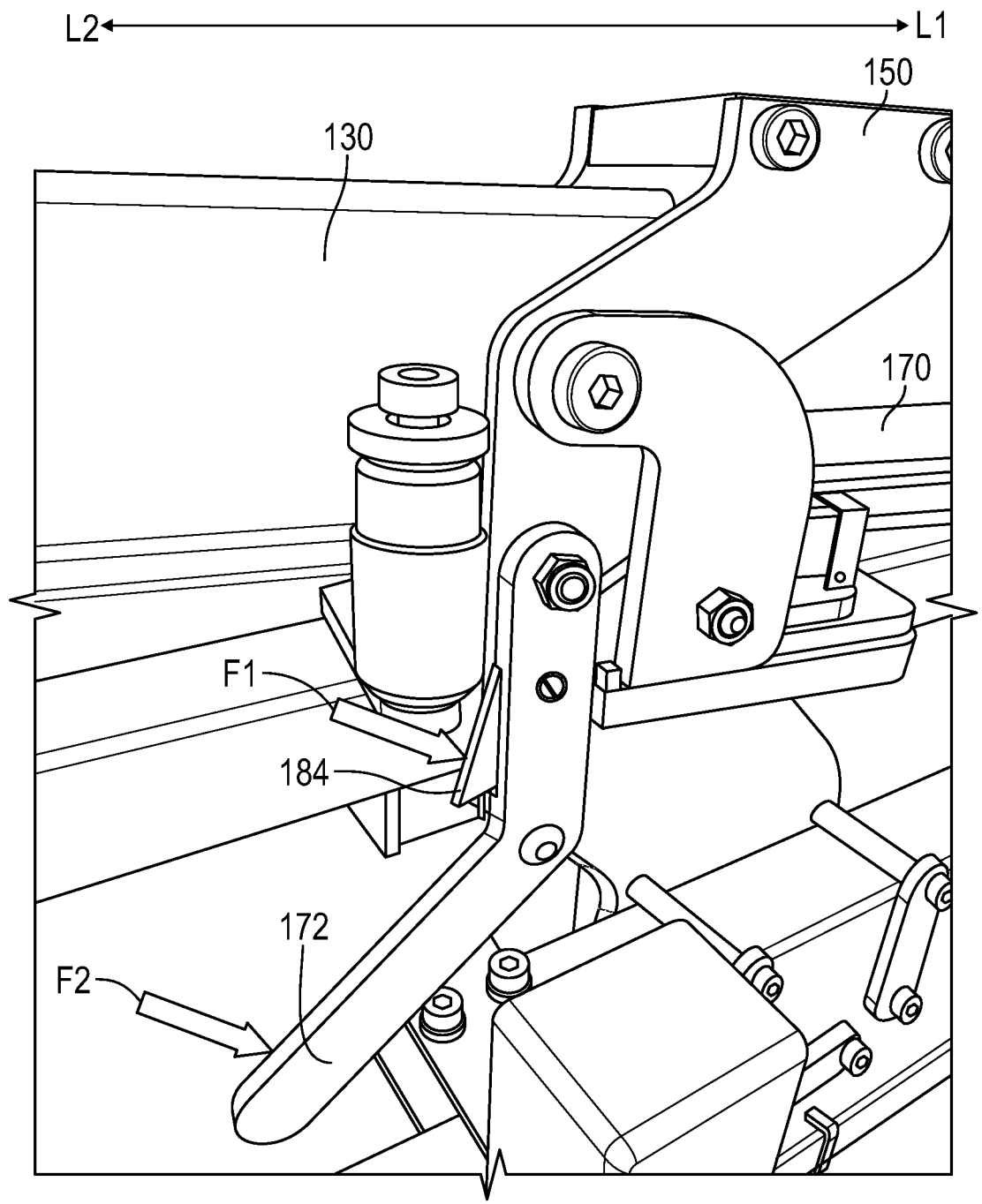
FIG. 12 illustrates a portion of the example clamp assembly shown in FIG. 7-11.
Figure 13:
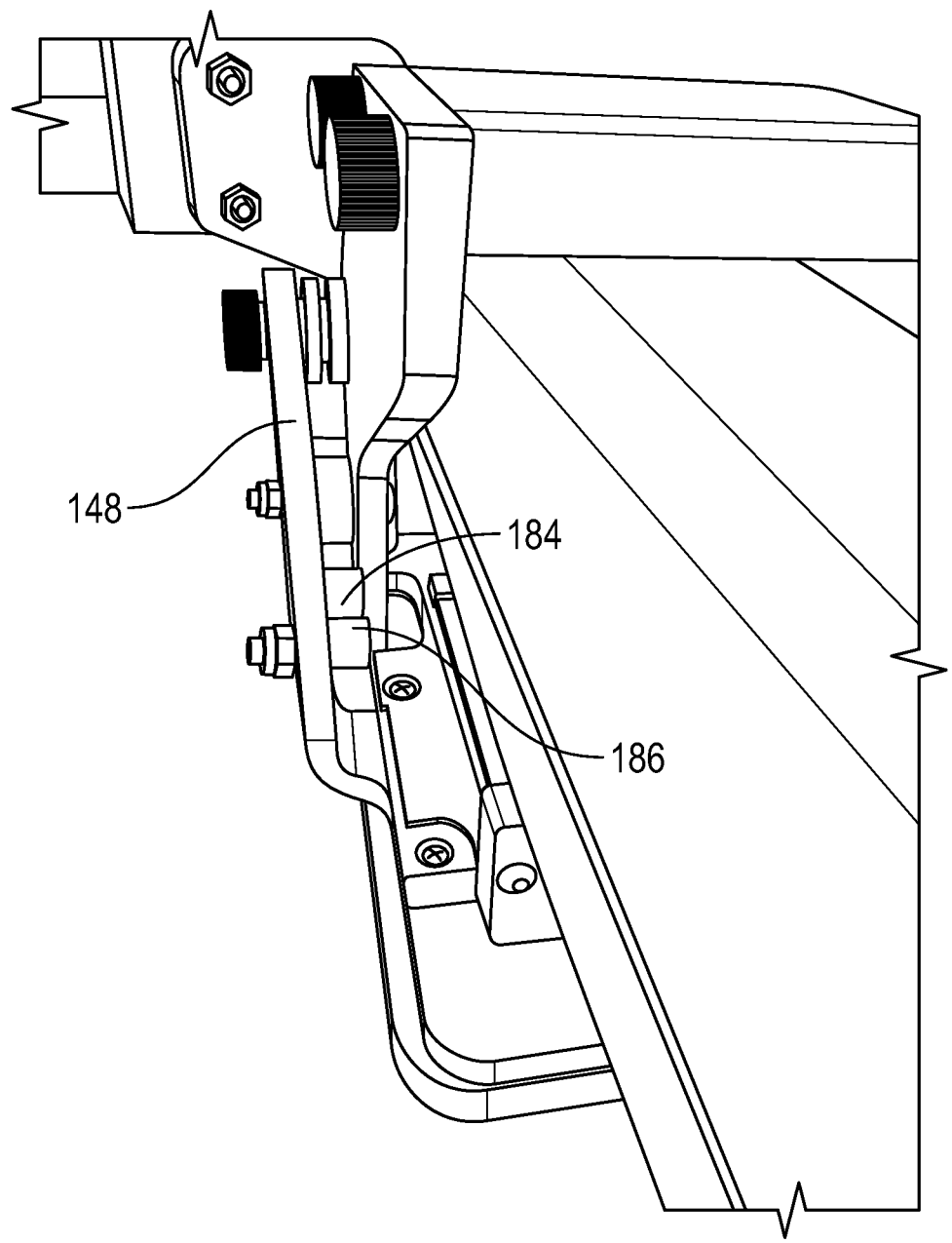
FIG. 13 illustrates a portion of the example clamp assembly shown in FIG. 7-12.

As shown in FIG. 12, the example lever 172 further includes a gravity latch 184 biased by gravity to hold the lever in a position associated with the gear engaged position. In this position, an upper portion of the gravity latch 184 rests on a protrusion 186 extending from an inner surface of the arm 148 (not shown; see FIG. 13). To disengage the latch, an operator pushes on the latch as shown schematically by F1. The operator can then pivot the lever 172 with a force generally in the F2 direction, and in turn pivot the hood 150 to the gear disengaged position, at which point the slider 130 will move in the L2 direction without any necessary force on the slider 130 by the operator, due to the spring 170. That is, the slider 130 automatically moves in the L2 direction when the gear becomes disengaged. The operator can then place a door or other work object on the carrier, and move the slider 130 with one hand to a closed position (with the clamp assembly 126 in the gear engaged position) that secures the door or other work object to the carrier. That is, the operator can move the clamp assembly 126 between opened and closed positions with one hand without risk of gear disengagement because the gravity latch renders lever 172 inoperable.

A method for supporting a work object can be said to include attaching a clamp assembly 26/126 to a frame configured to support the work object, and moving a slider 30/130 of the clamp assembly 26/126 linearly such that an extension 31 of the slider 30/130 contacts the work object to support the work object.

The example clamp assemblies 26/126 and methods allow for adjustability such that one work carrier 20 can be used to support vehicle doors 24 or other work objects of various shapes and sizes, allowing one work carrier 20 in a production facility to support doors of multiple vehicles, for example. Further, the example clamp assembly 26 can be quickly be adjusted between the gear engaged and gear disengaged position for quick attachment and removal of vehicle doors or other work objects, saving time on the production line. The example clamp assemblies 26 maintain a holding pressure within a given linear range at various positions.

In some examples, it is contemplated that the spur gear 34 and rack 36 could be replaced with a roller pinion or ratcheting or latch pawl engagement.

Although the examples shown relate to supporting vehicle doors, a skilled person having the benefit of this disclosure would realize that the disclosed clamp assemblies would benefit other applications, including general production, assembly, or manufacturing applications.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A clamp assembly for a work carrier, comprising:
   a base for mounting to the work carrier and including a rotatable spur gear;
   a slider including a main housing, a rack with a plurality of teeth along an upper surface of the rack for engaging the spur gear for linear movement of the slider relative to the base, and a clamp extension extending from the main housing to engage an edge of a work object supported by the work carrier, and
   a one-way roller clutch bearing is provided at a rotational axis of the spur gear to, when the spur gear is engaged with the plurality of teeth of the rack, permit movement of the slider in a first linear direction but prevent movement of the slider in a second linear direction opposite the first linear direction.

2. The clamp assembly of claim 1, wherein the base includes a lever for releasing the spur gear from the rack to allow the slider to move in the second linear direction.

3. The clamp assembly of claim 1, including a slide rail assembly having a slide rail fixed to one of the base and the slider and a guide fixed to the other of the base and the slider.

4. The clamp assembly of claim 1, wherein the spur gear has a second plurality of teeth that engage the plurality of teeth of the rack.

5. The clamp assembly of claim 1, comprising a spring configured to bias the slider in the second linear direction.

6. The clamp assembly of claim 5, wherein the spring is a constant force spring.

7. The clamp assembly of claim 6, wherein the spring includes a spiral wound strip wrapped around a rotatable spool and having one end fixed to the main housing.

8. The clamp assembly of claim 1, comprising
   a spring wrapped around a rotatable spool having one end fixed to the slider and configured to bias the slider in the second linear direction.

9. The clamp assembly of claim 1, comprising:
   a hood provided over the slider; and
   a lever extending from the hood and operable to disengage the spur gear from the rack.

10. The clamp assembly of claim 1, wherein the clamp extension includes a block having one or more grooves for receiving the edge.

* * * * *